Sept. 7, 1954
M. C. YEASTING
2,688,384
CIRCUIT MEANS FOR DISTRIBUTING ELEVATOR SERVICE ACCORDING TO DEMAND
Filed May 21, 1953
6 Sheets-Sheet 1
Fig I
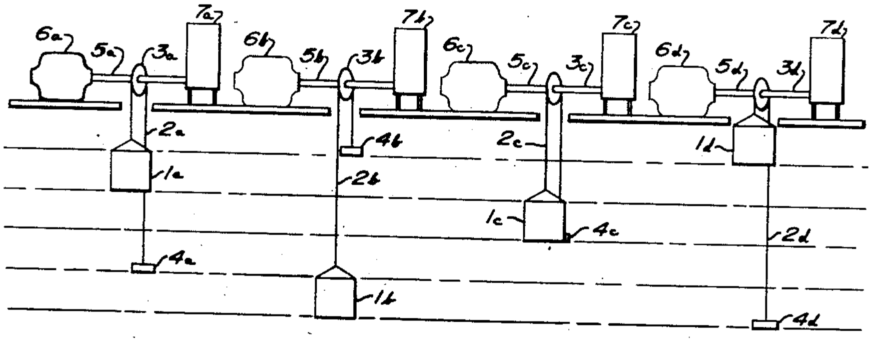
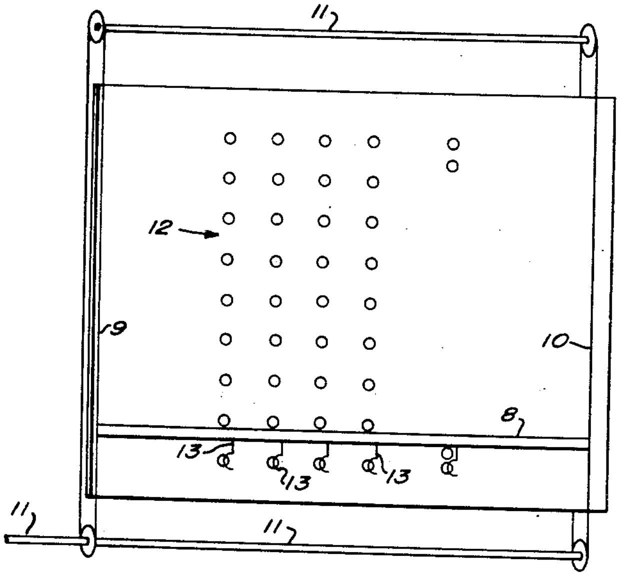
Fig II
INVENTOR.
MAYNARD C. YEASTING
BY
Marshall, Marshall & Yeasting
ATTORNEYS Sept. 7, 1954 M. C. YEASTING 2,688,384
CIRCUIT MEANS FOR DISTRIBUTING ELEVATOR SERVICE ACCORDING TO DEMAND
Filed May 21, 1953 6 Sheets-Sheet 2
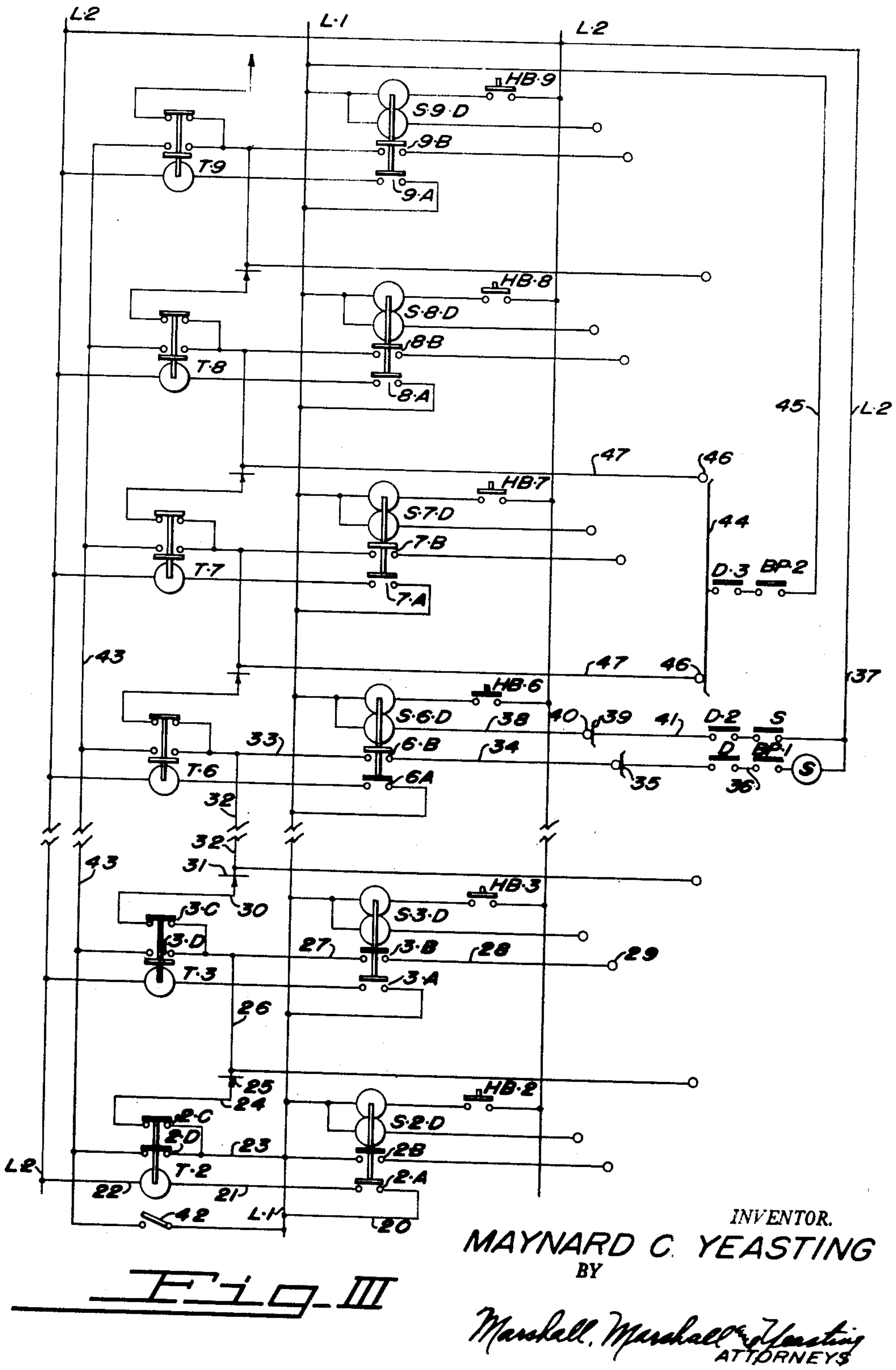
INVENTOR.
MAYNARD C. YEASTING
BY
Fig. III
Marshall, Marshall & Yeasting
ATTORNEYS Fig. IV
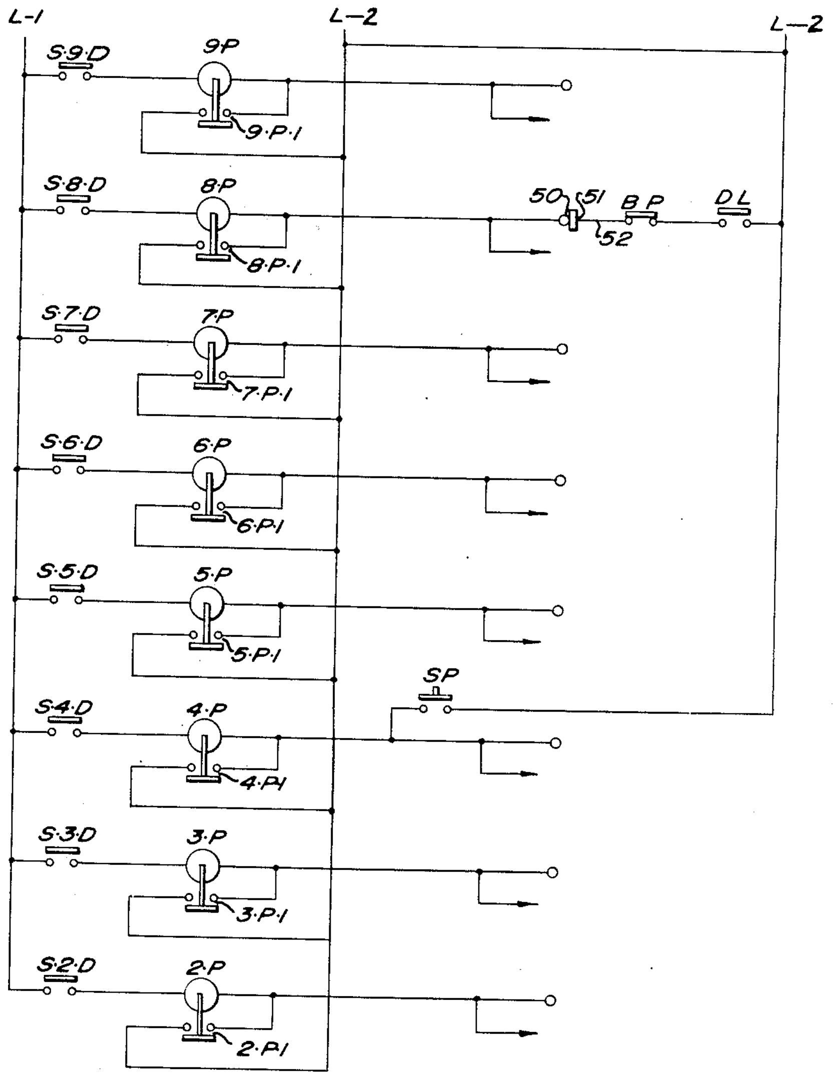
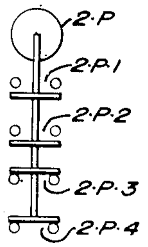
Fig. IV A
INVENTOR.
MAYNARD C. YEASTING
BY
Marshall, Marshall & Yeasting
ATTORNEYS Sept. 7, 1954
M. C. YEASTING
CIRCUIT MEANS FOR DISTRIBUTING ELEVATOR SERVICE ACCORDING TO DEMAND
2,688,384
Filed May 21, 1953
6 Sheets-Sheet 4
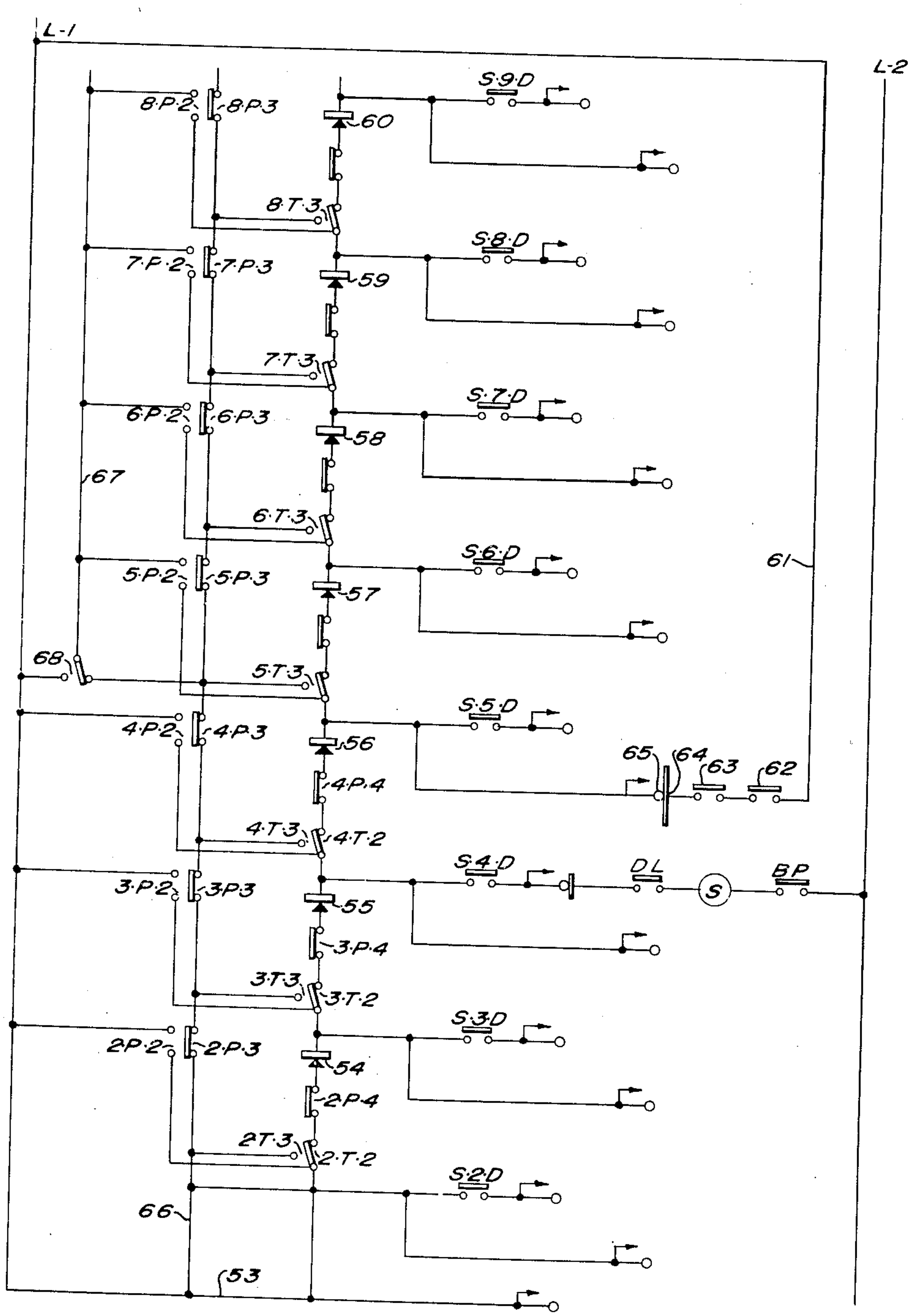
Fig. V
INVENTOR.
MAYNARD C. YEASTING
BY
Marshall, Marshall & Yeasting
ATTORNEYS

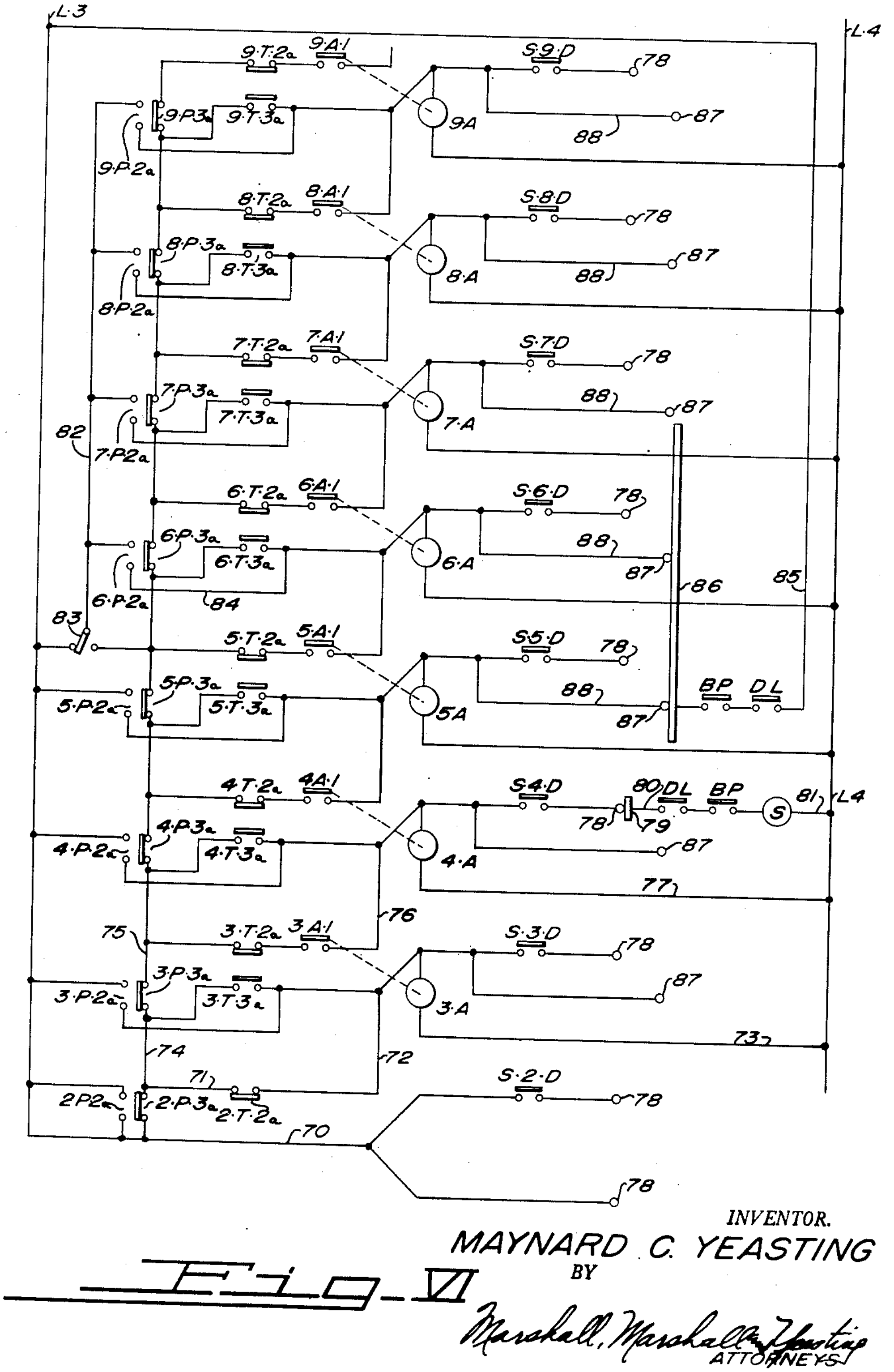
INVENTOR.
MAYNARD C. YEASTING
BY
Fig. VI
Marshall, Marshall & Yeasting
ATTORNEYS Sept. 7, 1954
M. C. YEASTING
CIRCUIT MEANS FOR DISTRIBUTING ELEVATOR SERVICE ACCORDING TO DEMAND
2,688,384
Filed May 21, 1953
6 Sheets-Sheet 6
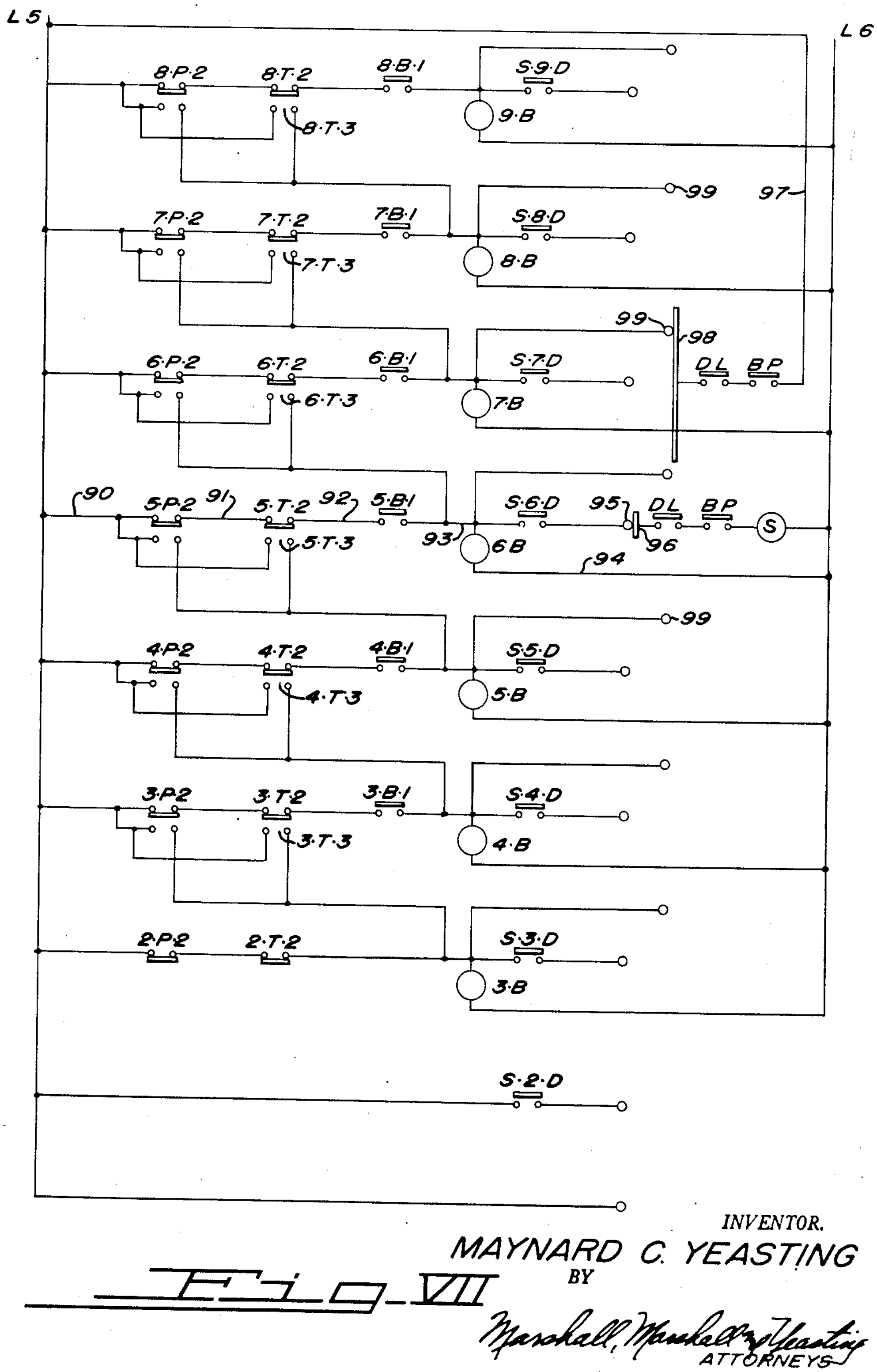
Fig. VII
INVENTOR.
MAYNARD C. YEASTING
BY
Marshall, Marshall & Yeasting
ATTORNEYS Patented Sept. 7, 1954

2,688,384

UNITED STATES PATENT OFFICE 2,688,384

CIRCUIT MEANS FOR DISTRIBUTING ELEVATOR SERVICE ACCORDING TO DEMAND

Maynard C. Yeasting, Elmore, Ohio, assignor to Haughton Elevator Company, Toledo, Ohio, a corporation of Ohio Application May 21, 1953, Serial No. 356,397

14 Claims. (Cl. 187—29)

This invention relates to elevator control systems and in particular to improvements in the floor relay circuits in order to improve the service afforded to intending passengers particularly during periods of heavy down traffic.

It is possible to improve the service as far as intending passengers are concerned particularly during down rush hours if the elevator floor selecting mechanism and floor selecting relay circuits are arranged to provide preferential service for overtime floor calls (calls not answered in a reasonable time) either with or without special preference for previously bypassed calls. In other words, the next down traveling car proceeds directly to the overtime call and ignores other calls above the overtime call. It is also possible to improve the service by providing in the event a down traveling car bypasses a registered down call that the next down traveling car shall proceed directly to answer the previously bypassed call. In either event the elevator service is as prompt as is possible under the circumstances.

These arrangements suffer from the disadvantage that when a large number of elevators are employed in a bank such as four or more it is quite possible that three or more cars may be proceeding downwardly at the same time. In that event, if the first car should start to bypass signals or in the event that overtime signals should appear all of the down traveling cars would bypass ordinary calls and proceed toward the previously bypassed call or the overtime call until such call is answered. This is undesirable since only one car is required to service these overtime or previously bypassed calls and the second car which is following the car answering such calls should stop and answer all ordinary calls.

The principal object of this invention is to provide circuit means and structure in the control circuits for a bank of elevators so that in the event one car starts to bypass calls or in the event that an overtime call appears only one car shall proceed to answer such call and provide preferential service for that call. Should two or more cars be proceeding downwardly at that time only the leading car that is in position to service such overtime call proceeds directly to that call, the other cars following that leading car operate in the normal manner and answer all calls in the order in which they are approached.

Another object of the invention is to provide improved circuits to give preferential service to certain floors of an elevator system or to provide preferential service under certain unusual conditions.

A still further object of the invention is to provide circuit means for limiting the preferred service calls to the one elevator that is next in position to service such calls.

Still further objects of the invention are to provide both direct current and alternating current circuits adapted to provide the improved type of service.

According to the invention, to provide preferential service, means are provided in a multicar elevator system to supply power to the stopping circuits for the various floors through a series circuit arrangement that is broken at a point corresponding to the floor to receive preferential service and re-energized immediately behind a point corresponding to the position of the first car approaching the call for preferential service. The series circuit arrangement for use with direct current comprises relay contacts corresponding to each floor, which contacts are opened when a call for preferred service is registered, means on the floor selector machine for each elevator to energize the series circuit for floors behind the elevator car, and rectifiers or other means to prevent the selector machine from energizing that part of the circuit corresponding to floors ahead of the elevator car. Alternatively, the series circuit arrangement may comprise a chain of relays, one for each floor, each of which is energized through contacts of the floor ahead (the floor below for down travel of the elevator car), and each of which is de-energized when a call for preferred service is registered at the corresponding floor. De-energization of one of the chain relays de-energizes all those relays above or ahead of that relay. Means are provided on the floor selector machines for re-energizing each of the relays of the chain as the elevator car passes the corresponding floor when answering the call for preferred service. This re-establishes power to the stopping circuits so that following elevator cars answer all calls.

The preferred service calls may be hall calls that have been registered an unreasonably long time, that have been bypassed, or they may be calls registered by an emergency or preferred service call system.

Preferred forms of the invention and appropriate circuits are illustrated in the accompanying drawings.

In the drawings:

Figure I is a simplified schematic view of a plurality of elevators arranged to serve a plurality of floors.

Figure II is a front view, simplified, of a contact assembly for one of the floor selector mechanisms and the carriage or bar carrying brushes cooperating with the contacts.

Figure III is a schematic wiring diagram showing a set of timer controls for timing the various floor calls, the timers being arranged to operate circuits to provide preferential service for each of the overtime calls and means for limiting the preferred service calls to the first car in position to answer them.

Figure IV is a schematic diagram showing an arrangement for energizing special auxiliary relays to provide special service for bypassed calls.

Figure IVA illustrates an auxiliary relay with additional contacts.

Figure V is a schematic wiring diagram showing the circuits for stopping the car and these circuits including both the timer controlled contacts and bypassed signal controlled contacts.

Figure VI is a schematic wiring diagram showing another method for controlling the circuits to prevent feedback from higher floors to lower floors through the stopping circuits. This circuit is arranged for alternating current operation.

Figure VII is a schematic view illustrating another alternating current circuit for providing preferential service. In this circuit the previously bypassed calls and the overtime calls are given equal preference.

The specific figures and the accompanying description are intended merely to illustrate the invention but not to impose limitations on the claims.

The improved circuits for providing preferred service include means for de-energizing the stopping circuits for all floors ahead of, or above, the floor requiring preferred service and establishing a second power circuit for the stopping circuit for that floor. The second power circuit may or may not be subject to higher priority calls. The separate or second power circuit is required to prevent a lower preferred service call from canceling or taking precedence over a higher preferred service call. If the lower preferred call is to take precedence it may be arranged to interrupt the second power circuit as well. The improved circuits for giving preferential service may be used with a bank of elevators regardless of the number of cars involved. Figure I illustrates a system having four cars arranged to serve a plurality of floors. Each of the elevator cars and its driving equipment is similar to each of the others so that similar reference characters are employed and the various cars are differentiated by adding letters to the reference numerals.

Each of the elevator cars 1 is suspended by a cable 2 that is carried over a drive pulley 3 and attached to a counterweight 4. The drive pulley 3 is carried on an armature shaft 5 of an elevator drive motor 6. The shaft 5 is also carried through so that it may drive a floor selecting machine 7 which is part of the control circuits for the elevator. One of the floor selecting machines 7 is shown in greater detail in Figure II. As shown therein it comprises a carriage 8 that is carried on chains 9 and 10 trained over pulleys on a bottom shaft 11 and similar pulleys on a top shaft 11'. The shaft 11 is connected through gearing to the elevator motor 6. A plurality of contacts 12 are arranged on the floor selecting machine either on a continuous insulating panel or on horizontally positioned strips. As shown in the figure the contacts 12 are arranged in vertical lanes according to the functions that they are to serve and are arranged in horizontal rows according to the floors to be served by the elevator.

Brushes 13 mounted on the carriage 8 are arranged to wipe over the contacts 12 as the carriage 8 is driven up and down in step with the movement of the elevator car 1 in the shaft. While only four lanes of contacts are shown in Figure II more are usually required for the control of an elevator. Thus, one lane may be used to operate position indicator lights in the car, another lane may be used for down stop signals, another lane for up stop signals, another lane for car stop signals, other lanes to reset the floor signals as the floor signals are answered, as well as other lanes for other control functions required by the elevator. The spacing of the contacts vertically is governed by the floor spacing in the building being served by the elevator since the carriage 8 is moved proportionally to the travel of the elevator car. The floor selector shown in Figure II is of the type in which a small constant speed motor is arranged to drive the carriage 8, that motor also being connected to the elevator drive motor 6 by means of a differential gearing. The output shaft or third member of the differential gearing controls a rheostat and switch mechanism for operating the elevator motor 6. In such a system when the elevator is to move from one floor to another the small constant speed motor drives the carriage 8 to the next floor or to a floor at which a stop is to be made. This small motor starts and stops very quickly and drives the carriage at a uniform speed. The differential mechanism and rheostat is arranged to operate the elevator drive motor 6 at a speed generally proportional to the distance the carriage 8 is out of step with the elevator car. Thus the drive motor 6 accelerates smoothly as the elevator drops behind an in-step position, runs at uniform speed at a predetermined lag in position, and decelerates smoothly as the elevator overtakes the carriage after the carriage stops for the next call. The full speed lag is from one to two floors depending upon the operating speed.

In other types of control the position of the brushes 13 may be varied so that stopping signals for the elevator will be given sufficiently in advance of the arrival at a floor so that the stops may be made without discomfort.

The method of controlling the elevator itself as far as moving from one floor to another forms no part of the present invention and therefore has been described very briefly.

The invention consists in improvements in the control system particularly in the registration and answering of down hall calls. Since during rush down-traffic periods passengers from the upper floors of a building may tend to monopolize the elevator service by completely filling the cars so that they bypass other registered calls, intending passengers at lower floors may have to wait long periods of time before an elevator is available to answer their calls. In the control circuits shown in Figure III and following various arrangements are provided so that in the event a floor call is not answered within a reasonable time the next down traveling car is caused to ignore any down calls at higher floors and proceed directly to the overtime call. Likewise in some of the circuits if a down floor call has been bypassed the next following down traveling car will bypass higher calls and proceed directly to the previously bypassed floor before it again answers down calls. The circuits are further arranged so that in addition to bypassing normal calls in favor of a previously bypassed call or an overtime call, the car (which may be termed special) while it is answering such a preferred call re-establishes normal service for floors above the instantaneous position of the car. By this means only one car will proceed downwardly bypassing normal calls to render service for the overtime and previously bypassed calls and a following car or cars will answer all calls in a normal manner. The circuits are further arranged so that in the event an overtime call appears behind the car which is proceeding downwardly to answer a previous overtime call, the next following car will become special with respect to the latter overtime call. In this arrangement no car will become special and give preferred service unless there is a call for preferred service existing above the previous down traveling car and ahead of the car in position to answer such call or provide such service. The circuits are further arranged so that a down traveling car that is bypassing calls, i. e., one that is loaded, will not re-establish normal service for following cars but will, as long as a demand for special service exists, allow the following car to provide such special service.

Figure III shows the equipment necessary to provide the preferential service for overtime calls on down signals. This equipment includes a floor call registering relay for each floor, the relays S2D for the second floor, S3D for third floor, and so on up for the remaining floors. No such relays required at the lobby floor unless the car also must serve a basement. Also associated with each floor is a timer relay, T2 for the second floor, T3 for the third floor and so on up for the remaining floors.

The floor relays S2D and so forth are each of the latch relay type, i. e., they have an upper coil arranged to unlatch the relay and permit it to close its contacts and a lower coil to relatch the relay. The upper coils are arranged to be energized through hall buttons HB2, HB3 and so forth as long as an intending passenger pushes the button. As soon as a button is pushed the floor relay unlatches and drops its armature to close its contacts. Each of the floor relays S2D and so forth is provided with a plurality of contacts, two of which are shown. The lower sets of contacts on these relays, such as the contacts 2A of the second floor relay or 3A of the third floor relay, etc., are arranged to complete circuits from a first lead L1 through the now closed contacts of any energized, i. e. unlatched, floor relay and through leads connected to operating coils of the timer relays T2, T3, etc. Such a circuit for the second floor includes the positive lead L1, a branch lead 20, the now closed contacts 2A, a lead 21, the coil of the timer relay 2T, and a lead 22 that is connected to a negative return lead L2. Each of the floor relays S2D, etc., also includes a B contact such as the contact 2B for the second floor, 3B for the third floor, etc. These contacts are included in the stopping circuits for the elevator. Thus, supposing an intending passenger on the third floor pushes hall button HB3 he thereby unlatches relay S3D so that it closes its contacts 3A and 3B. The closing of the contacts 3B completes a circuit which may be traced from the positive lead L1 through a lead 23, normally closed contacts 2C of a timer relay 2T, through a lead 24, a halfwave rectifier 25, a lead 26 and lead 27 to the now closed contacts 3B of the third floor relay S3D and to a lead 28 to the stopping contact lane 29. As long as the contact 29 of any of the floor selector machines is energized, these contacts being connected in parallel, the next down coming car to reach that floor while operating in its normal manner will stop at that floor.

As shown in the drawings an elevator is stopped at the sixth floor in response to a call at that floor. In order for the elevator to stop at the sixth floor the relay S6D would have been unlatched so that current could flow from the positive lead L1 through the lead 23, the closed contacts 2C of the second floor timer relay 2T, the lead 24, rectifier 25, lead 26, normally closed contacts 3C of the third floor relay, a lead 30, rectifier 31, lead 32 to a lead 33, through then closed contacts 6B of the sixth floor relay S6D, through a lead 34 and the sixth floor contact of the lane 29, through a brush 35 cooperating with that lane and contacts D of a down directional preference relay, these contacts being closed as long as the elevator is conditioned for downward travel, then through a lead 36, contacts BP1 of a bypass relay and through a stopping control S and lead 37 connected to the return line L2. The bypass contacts BP1 are closed as long as the elevator is operating in its normal manner and are opened as soon as the elevator operator operates his bypass switch in order to bypass registered calls. As the elevator stopped at the sixth floor, the stopping control S, just described, closed contacts S in the line just above. Contacts D2 of the down direction preference relay were closed so that current flowed from the lead L1 through the lower coil of the S6D floor relay, lead 38 and brush 39 cooperating with a reset lane of contacts 40, lead 41, through contacts D2 in this circuit and contacts S that are closed by the stopping control and thus to the return lead 37. Current flow through this circuit relatches the sixth floor relay S6D so as to open its contacts 6A and 6B.

Let it be assumed now that the call at the second floor has been registered for some time so that the timer T2 has timed out. At the expiration of its time, it opens its contacts 2C and 2D. The contacts 2D are bypassed by a switch 42. Assume also that a call has just been registered at the third floor. The elevator in traveling downwardly approaches the third floor and as its brush 35 meets the contact at the third floor in the lane 29 it does not receive a stopping signal because the flow of power from the lead L1 to energize such contact, even though the contacts 3B are closed, is interrupted by the opening of the contacts 2C of the second floor timer. Therefore the stopping circuit is not completed at the third floor and the elevator bypasses such floor and proceeds directly to the second floor where the stopping circuit is completed and the elevator stops for the call. The third floor relay S3D is not reset as the elevator passes the third floor because the contacts S in the reset line 41 are not closed at that time.

Referring more particularly to the circuit from the positive lead L1 up through the lead 23, the normally closed contacts 2C of the second floor timer 2T, leads 24 and 26, contacts 3C, leads 30 and 32 and so forth, it will be noticed that this circuit includes normally closed contacts of each of the timers. Each of these relays also includes a second set of contacts, the D contacts, that are closed as soon as the timer is operated. The D contacts on each of the timers are arranged to complete a circuit directly from a lead 43 that is energized from the line L1 either through the switch 42 or contacts 2D of the second floor relay T2. It should be noted that the contacts 2D are reversed from the corresponding contacts of the other timers. As long as the switch 42 is closed contacts 2D have no effect upon the energization of the lead 43. It will be assumed for the moment that the contact switch 42 is closed. When a signal, say at the third floor, has been registered long enough for the third floor timer T3 to operate it opens its contacts 3C and closes its contacts 3D so as to interrupt the flow of power to the lead 30 and so on to the higher floor relays and at the same time completes a circuit from the lead 43 directly to the lead 27 and thence through the contacts 3B of the third floor relay S3D to the contact of the stopping lane 29. The opening of the contacts 3C interrupts the flow of power to any of the stopping circuits above the third floor and at the same time the closure of the contacts 3D provides power to the lead 27, the stopping circuit for the third floor, so that whether the timer on the second floor operates or not the elevator will still stop at the third floor.

The switch 42 is included in the event it is desired to give an overtime call at the second floor preference over overtime calls at higher floors. Thus when the switch 42 is opened and the second floor timer T2 operates it breaks the circuit through the contacts 2D to the lead 43 so that regardless of whether or not the timers for the higher floors have operated there is no power available for stopping circuits for those floors. Therefore the next down traveling car receives no stopping signals and proceeds directly to the second floor. The special preference provided by the switch 42 and contacts 2D of the second floor timer T2 could, of course, be applied to any other floor at which such special preference is required.

In order that only one car shall bypass calls in answer to a special or preferred service call and in order that following cars shall be able to stop for registered hall calls a brush 44 is added and is connected to the lead L1 through a lead 45 including bypass contacts BP2 and down preference relay contacts D3. This brush 44 cooperates with a special lane of contacts 46 each of which is in turn connected by leads 47 to the corresponding points in the circuit traced through the normally closed contacts C of the timer relays T2, T3, etc. The special lane contacts 46 are, at each floor, connected into the circuit just above the rectifiers 25, 31 etc. Power flow from the line L1 through the brush 44 thus may flow upwardly through the series circuit and thus energize the stopping circuits for any floors above. However, current cannot flow down along this circuit to lower floors because of the rectifiers 25, 31 etc. The rectifiers are required to prevent the brush 44 of an elevator from energizing the circuit ahead of that elevator so that it would stop at normal calls rather than proceeding directly to a preferred service call. Any following car, however, may receive the stopping signals by way of the brush 44 and the floor relay contacts for the higher floors.

The inclusion of the contacts BP2 in this circuit provides that if the car is loaded and is bypassing signals because of that loaded condition it will not re-establish or provide normal service for a following car but will permit such following car to proceed directly to the call requiring preferred service. The brush 44 thus provides means for re-establishing normal service for floors above a car that is answering a call for preferred service.

To improve the service rendered by the elevator system it may also be desirable to cause the next down traveling car to proceed directly to a floor call that has been bypassed by the preceding car. Thus, during down rush periods it often happens that a car becomes fully loaded at the top or the next to the top floor and then proceeds to bypass further down calls as it travels down the shaft. The next following car may also become fully loaded at the upper floors and it also will bypass lower floors. This may happen to such an extent that an intending passenger on a lower floor may have to wait until all of the passengers from upper floors have been served before a car can answer his call. Even if overtime preference is given this situation may still occur because as soon as the calls in the higher floors become overtime calls they take preference over lower overtime calls. When this happens the higher overtime calls are served first and then, if there is any space left in the down traveling cars, they stop for lower calls.

To correct this difficulty it is possible to add an auxiliary relay for each floor which relay is arranged to be energized and sealed in when a down traveling car which is bypassing signals because it is fully loaded passes the floor when a call is registered. When this occurs the auxiliary relay is energized and acts to interrupt the stopping circuits for all of the floors above that point. In that event the next down traveling car will ignore all calls above and proceed directly to the previously bypassed call. Circuits arranged to include this type of operation are illustrated in Figures IV, V, VI and VII.

Figure IV illustrates the circuits for energizing auxiliary relays 2P, 3P and etc. in response to a car bypassing a registered hall call. Contacts operated by these relays are included in the stopping circuits but are not shown in Figure IV. Also certain contacts of the various floor relays are shown in Figure IV, it being understood that these contacts are in addition to the floor relay contacts shown in Figure III. It is further understood that when a call is registered at a floor the corresponding contact S2D, S3D, S4D, etc. will be closed.

If an elevator that is bypassing calls while proceeding downwardly in its shaft arrives, as is shown in Figure IV, at the eighth floor and the floor relay at that floor has been energized to register a down signal current flows momentarily from the line L1 through the now closed contacts S8D; operating coil of the relay 8P; contacts 50 of a bypass set lane; brush 51 carried on the selector machine carriage and cooperating with the contacts 50; lead 52 through the now closed bypass relay contacts; and DL contacts, also now closed; to the line L–2. The DL contacts are included on the down preference relay and are closed as long as the car is conditioned for downward travel.

Current flow through this circuit energizes the relay 8P so that it closes its contacts 8P1 thereby completing a holding circuit directly to the return line L–2. This relay therefore remains energized until the call at that floor has been answered and the corresponding floor relay S8D has been reset. To emphasize the cooperation or function of the elements, particularly relays, the same reference number is used for the relay, its coil, or its contacts. The context will always distinguish between coil or contacts. Thus in the arrangement shown each of the auxiliary relays 2P to 9P inclusive may be energized and electrically sealed into energized position whenever an elevator passes a down call registered at the corresponding floor. The only way in which an elevator may pass a down call is to be operating with its bypass switch thrown. In that event the circuit will be completed to operate the corresponding auxiliary relay.

As shown in Figure IV*a* each of the auxiliary relays may include additional contacts some of which may be normally open, and others normally closed.

A special service switch may be included for any floor to provide preferred service for that floor. Such a switch SP is shown in connection with the fourth floor and is arranged to energize the auxiliary relay P4 and thus give the same signal as if that floor had been bypassed. As shown the regular hall button would have to be pushed as well as the switch button SP. Alternatively, the switch SP could be provided with two sets of contacts, one in parallel with the hall button and the other as shown.

Figure V illustrates a stopping control circuit including the contacts of the auxiliary relays and timer relays without showing the operating coils of either of these sets of relays. The circuits for the operating coils are shown in Figures III and IV. Also only the stopping circuit contacts of each of the floor relays ars shown herein.

As shown in Figure V power for the stopping circuits is taken from the lead L1 through a lead 53; normally closed contacts 2T2 of the second floor call timer; normally closed contacts 2P4 of the second floor auxiliary relay 2P; a rectifier 54, contacts 3T2 of a third floor timer; contacts 3P4 of the third floor auxiliary relay; rectifier 55; contacts 4T2 of the fourth floor timer; contacts 4P4 of the fourth floor auxiliary relay; and rectifier 56 and so on through timer and auxiliary relay contacts; and rectifiers 57, 58, 59 and 60. The stopping circuit for each floor is tapped off from this circuit above the timer and auxiliary relay contacts for the floor below. The rectifiers are provided to prevent any flow of power from the line L1 through leads 61 and bypass contacts 62, down direction preference relay contacts 63, brush 64 which cooperates with a special lane of contacts 65 arranged to provide power to that portion of the previously described series circuit that is above the actual location of the car answering the special calls. Since direct current is employed the rectifiers 54, 55 and so on prevent the flow of power from the brush 64, through the contacts 65 to the floor circuits corresponding to those floors below the car. Stopping circuits including floor relay contacts S2D, etc.; selector machine contacts and stopping relays are the same for this arrangement as for the arrangement shown in Figures III and will not be further described.

In order that preferential service may be provided for overtime calls each of the timer relays is arranged to break the series circuit and establish a second circuit by closing its contacts T3 so as to connect the stopping circuit for the particular floor to a second series circuit that includes contacts 2P3, 3P3, 4P3 etc. of the auxiliary relays. Therefore when a timer times out, indicating an overtime signal, it transfers the stopping circuit for that particular floor to the second series circuit and at the same time interrupts the flow of power through the first series circuit to any stopping circuits above that point.

The corresponding one of the auxiliary relays 2P, 3P, etc. is operated and sealed in whenever a car passes a down signal at that floor while its bypass switch is thrown. When energized the auxiliary relay opens its normally closed (number 3) contacts and closes its normally open (number 2) contacts. For example, if the third floor signal had been bypassed the opening of the 3P3 contacts opens the series circuit thereby interrupting the flow of power through the second series circuit to any of the stopping circuits above while the opening of the normally closed 3P4 contacts interrupts the first series circuit. These stopping circuits are fed through the second series circuit only in the event an overtime call has been registered at some lower floor and that call is the only one fed through the second series circuit.

When the auxiliary relay closes its P2 contacts it connects the stopping circuit for the corresponding floor directly to the line L1 except in the case of the fifth, sixth, seventh, eighth, and ninth floors, as shown in the figure where a line 67 energized through the auxiliary relay contacts 2P3, 3P3, and 4P3 is substituted for the line L1. In this circuit arrangement the elevator control system operates in the normal manner as long as there are no overtime calls and no previously bypassed calls. In the event that a down hall call becomes an overtime call, has been registered for a sufficient length of time, the corresponding timer relay for that floor operates to break the first series circuit feeding the stopping circuits for the floors above and completes the circuit to the auxiliary relay series circuit (the second series circuit) to energize the stopping circuit for that particular overtime signal. Therefore, the next down traveling car will bypass higher calls until it arrives at this overtime call.

However, should there be a bypassed call at a lower floor, the next down traveling car ignores the higher overtime calls and proceeds directly to answer the previously bypassed floor call. This arrangement gives the previously bypassed floor calls priority or preference over overtime calls registered on the floors above and thereby prevents the long time wait at lower floors during rush periods when all of the signals may become overtime calls. While ordinarily it is desirable to have the next down traveling car proceed directly to the highest previously bypassed call it may be desirable under some circumstances to give certain lower floors special preference as is done in this case by the use of the lead 67 energized through the second series circuit of certain lower floors. Should it be desired to give all of the previously bypassed floors equal preference, that is allow the car to stop at the highest previously bypassed call then a switch 68 ordinarily connecting the lead 67 to the second series circuit is thrown to connect the lead 67 to line L-1. As long as this switch is closed to the left the lower floors, that is the second, third and fourth floors, no longer have preferred preferential service over previously bypassed calls at higher floors while when thrown to the right a previously bypassed call at the second, third or fourth floor takes preference over all other down calls.

The normally closed contacts of each of the auxiliary relays 2P, 3P, 4P, etc. is included in the first series circuit between the timer contacts for a given floor and the rectifier for that same floor. This is to prevent a feedback or sneak circuit which otherwise would exist as soon as a bypass relay is thrown for a higher floor and no overtime signal exists for that floor. If it were not for this last mentioned auxiliary relay contact power would flow directly from the lead L1, or the lead 67, to energize the stopping circuit for the particular bypassed floor and would flow upwardly through the first series circuit including the timer contacts and rectifiers to provide normal service for the floors above. However, the addition of these auxiliary relay contacts breaks this circuit and thus insures that the next down traveling car will travel directly to the highest previously bypassed call.

In this circuit, as in the circuit shown in Figure III, power is supplied through the brush 64 of the carriage 8 of the particular floor selector mechanism to feed power to stopping circuits for the floors above the instantaneous position of the car. It should be kept in mind that corresponding contacts of corresponding lanes of contacts on the floor selector machines are connected in parallel. The small arrows shown on the drawings are intended to show such parallel connections.

The circuits just described provide preferential service for overtime calls and previously bypassed calls. They also provide that a car answering such calls, which may be termed a special car during such time, may proceed directly to that call and at the same time re-establish normal service for the floors above the instantaneous position of the special car. In the preceding circuits rectifiers are employed to prevent the special car from providing or re-establishing the flow of power to the stopping circuits that are ahead of it in its direction of travel. In order to use rectifiers for this purpose it is necessary that the circuits be operated on direct current and that the polarity be selected according to the rectifiers so that power may flow from a stopping circuit of a lower floor upward to energize stopping circuits of higher floors but so that power cannot flow in the opposite direction.

In many cases it is desirable to use alternating current for the signal circuits for the elevators. If it is desired to use alternating current, relays may be substituted for the rectifiers and the relays may be connected as illustrated in Figure VI. Figure VI shows the contacts that are operated by the auxiliary relays, those relays at each floor that are energized when a car passes a signal at that floor without stopping to answer the signal. It also includes contacts that are operated by timers, the timers being arranged to time the duration of a signal at a floor and to operate certain contacts after that signal has been registered for a predetermined length of time. This figure also shows the contacts of the call registering relays or floor relays for each floor. These contacts are marked S2D, S3D, etc. In addition to these contacts a chain of relays 3A, 4A, 5A etc. one for each floor from the third up is provided. These relays are arranged each to be energized by a circuit including contacts of the timer, auxiliary relay and chain relay for the next floor below. As long as no need for preferential service exists each of the relays is energized. When a call or need for preferential service occurs the chain relay for the floor above is de-energized. As that relay opens its contacts it de-energizes the circuit for the relay next above. That relay in turn de-energizes the next one above and so on for all of the chain relays from that point up. Thus as is shown in the figure the stopping circuit for the second floor is energized from the line L3 through lead 70 and contacts S2D whenever a call is to be answered at the second floor. At the same time current may flow from the line L3 and lead 70 through contacts 2P3*a*; a lead 71; normally closed contacts 2T2 of the timer for the second floor; lead 72; the coil of the chain relay 3A; and lead 73 connected to the return line L4. This relay thereupon closes its contact 3A1 so current may flow from the line L3, etc., up through lead 74, normally closed contacts 3P3*a* of the third floor auxiliary relay 3P; then through lead 75, normally closed contacts 3T2*a* of the third floor timer; the now closed contacts 3A1 of the third floor chain relay and then through lead 76 to the operating coil of the fourth floor auxiliary relay 4A and through its return lead 77 to the line L4. This relay thereupon closes its contacts 4A1 so that power may flow from the series circuit including the normally closed contacts P3 of the auxiliary relays and the normally closed branch circuits including the normally closed T2*a* contacts of timers and the contacts of the chain relays so that each chain relay in turn energizes the chain relay for the next higher floor. In this way normal service is provided for each of the stopping circuits, these circuits being completed whenever a call is registered at a floor to close the contacts S2D, S3D etc. for that floor.

These stopping circuits include contacts on the floor selector mechanism arranged in a lane 78 which cooperate with a brush 79 of the floor selector machine to complete a circuit through a lead 80; down preference relay contacts DL; bypass relay contacts BP and the stop circuit for the elevator and then through lead 81 to the return line L4. Since this stop circuit is well known it will not be further described.

If the call was registered, say at the fifth floor, and that call is not answered within the predetermined time the timer 5T for the fifth floor operates to open its contacts 5T2*a* and close its contacts 5T3*a*. The opening of the contacts 5T2*a* interrupts the circuit to the sixth floor chain relay 6A so that it thereupon releases and opens its contacts 6A1 thereby de-energizing the seventh floor chain relay 7A. This process continues on up the line so that the overtime signal at the fifth floor results in de-energizing the chain relays for the sixth, seventh and higher floors.

The closure of the contacts 5T3*a* when the fifth floor timing relay timed out completes a second circuit from the auxiliary relay series circuit to the fifth floor chain relay coil and the stopping circuits for that floor. This circuit prevents the de-energization of the fifth floor chain relay 5A by any overtime signal at a floor beneath. Without this second circuit through the 5T3*a* contact any overtime signal below would de-energize the fifth floor chain relay so that the next following car would fail to stop at that floor.

The auxiliary relay contacts are also arranged to provide preferential service for previously bypassed down signals. In this case suppose that after the overtime signal at the fifth floor has been answered and an ordinary signal is registered at the sixth floor a car fully loaded at a higher floor bypasses the sixth floor call. As the car bypasses that call it energizes the sixth floor auxiliary relay by circuits shown in Figure IV. The sixth floor auxiliary relay 6P thereupon opens its contacts 6P3*a* and closes its contacts 6P2*a*.

The opening of the contacts 6P3a interrupts the flow of power to the stopping circuits for the higher floors thereby de-energizing all of the chain relays 7A, 8A, 9A etc. The closure of the contacts 6P2a at the same time completes a circuit from a lead 82, which is energized through the normally closed contacts of a switch 83 connecting the lead 82 to the line L3, and then through the contacts 6P2a, now closed, directly to the lead 84 that is connected to energize the sixth floor chain relay 6A. This relay thereupon remains energized regardless of whether the auxiliary relays for lower floors have been energized or not or whether overtime signals exist at lower floors.

This circuit is also arranged by means of the switch 83, when the switch is thrown to the right, so that lower floors such as the second, third, fourth and fifth floors may have special preferential service in the event that a call at one of these floors is bypassed by a down traveling car. In that event the auxiliary relay for the passed one of these floors is energized and it thereupon, by opening the series circuit through the P3a contacts, de-energizes the lead 82 and thus de-energize all of the chain relays for the higher floors regardless of whether or not their auxiliary relays have been operated. In the event that it is not desired to include this special preferential service the switch 83 is left in position to connect the line 82 to the power line L3. If the special preferential service is never required the lead 82 may be permanently connected to the line L3.

This circuit also provides for re-establishing normal service for cars that are following a car that is answering a preferential call. This re-establishing of normal service is accomplished through a lead 85 that is connected through bypass relay contacts BP and down preference relay contacts DL to a brush 86 that is arranged to cooperate with a reset lane of contacts 87. The brush 86 is long enough to contact at least two of the contacts in the lane 87 at all times. This means that it may momentarily contact three of such contacts. This brush 86 through the lane of contacts 87 provides power through leads 88 to energize the chain relays for the two floors above the instantaneous position of the car. Thus regardless of whether such relay has been previously energized or not it will be energized under this condition.

If there is no demand for special service at the floor above the instantaneous position the energization of that chain relay has no effect by itself. However that relay by closing its contacts permits the flow of power from the brush 86 through the next above contact 87 to energize that chain relay and at the same time through the now closed chain relay contacts of the floor below will energize the series circuit to provide power for any floors above. This re-establishes the flow of power to the series circuit including the normally closed P3a contacts of the auxiliary relays for all the floors above the instantaneous position of the car and downwardly to the previously bypassed floor. However, the flow of power down this circuit does not re-establish stopping circuits for these lower floors because the chain relays at these floors cannot be energized unless the bottom relay of the group is energized. That is the reason why the brush 86 must contact at least two contacts 87 of the reset lane. Without such span each of the chain relays would be energized in turn but there would be no flow of power to energize the higher relays because there would be no connection through the contacts of the lower chain relay to the higher floor timer operated contacts.

This circuit by using a chain relay for each floor and arranging that these relays be controlled through timer operated contacts or auxiliary relay contacts provides that operation of any of these preference demands such as overtime or previously bypassed calls interrupts the flow of power to the stopping circuits for the floors above to provide preferential service and at the same time the elevator car that is answering such call, through its floor selector mechanism, provides a feedback path of power to re-establish normal operating service for the higher floors.

In the circuit as shown in Figure VI the previously bypassed calls take preference over the overtime calls. Furthermore, as long as the switch 83 is closed to the right previously bypassed calls on the second, third, fourth and fifth floors take special preference over any other previously bypassed calls at higher floors. This provision makes it possible to provide efficient, quick service to the lower floors which may be utilized by top executives of an organization or others who demand and should receive special preferential service.

In some installations it is unnecessary to provide special preferred service or to give the previously bypassed calls preference over overtime calls at floors above. If the overtime calls and the previously bypassed calls are to be given equal preference the circuits shown in Figure VI may be simplified to the form shown in Figure VII.

As shown in Figure VII there are auxiliary relays 3B, 4B etc. one for each floor and each of these relays is energized directly from a power line L5 by way of normally closed P2 contacts of the auxiliary relays P, one for each floor, and normally closed timer contacts T2. Also included in each of these circuits are normally opened B1 contacts of a chain relay B for the floor below. Thus the sixth floor chain relay 6B is energized from the line L5 by current flowing through a lead 90, normally closed contacts 5P2 of the fifth floor auxiliary relay, a lead 91, normally closed contacts 5T2 of the fifth floor timer, a lead 92, and now closed contacts 5B1 of the fifth floor auxiliary relay, and a lead 93 connected to the operating coil of the chain relay 6B. From this coil the current flows through a return lead 94 to a return power line L6. The lead 93 also energizes the stopping circuit for the sixth floor which circuit is completed when the sixth floor relay S6D is operated so that current may flow to stopping lane contacts 95, and a floor selector machine brush 96 cooperating with the contacts 95 of that lane when a car approaches that floor. The car stopping circuit includes directional preference relay contacts DL, bypass relay contacts BP, and a stopping circuit S for the elevator. Just as in the other examples the lane of contacts 95 is duplicated on each of the floor selecting machines and the contacts are all connected in parallel, that is the corresponding floor contacts for each floor are connected in parallel on the various machines. In this arrangement as long as there is no call for special service or preferred service each of the chain relays 3A, 3B, 4A, 4B etc., are energized. These circuits may be traced for the relay 3B from the line L5, contacts 2P2 and 2T2 leading directly to the operating coil 3B. This relay thereupon closes its contacts 3B1 so that current flows from the line L5, through contacts 3P2, 3T2, now closed contacts 3B1 to energize the auxiliary reay 4B. Likewise, the circuits for the remaining auxiliary relays 5B, 6B, etc. are completed through the circuits controlled by the timer and the auxiliary relay for the floor beneath.

Should a preferred service call exist at any of the floors either by such call becoming an overtime call or by being previously bypassed, the corresponding auxiliary relay or timer relay is operated. Assume that such a call exists at the fourth floor and that it be an overtime call. In such an event the contacts 4T2 are opened while the contacts 4T3 would be closed. The opening of the contacts 4T2 de-energizes the relay 5B in the event that no call for preferential service exists at the fifth floor. The closure of the contacts 4T3 completes a circuit from the line L5 directly to the fourth floor chain relay 4B so that a subsequent overtime or bypass call at a lower floor will not de-energize the chain relay 4B. The de-energization of the relay 5B opens its contacts 5B1 thereby de-energizing the sixth floor chain relay and it in turn de-energizes the next and so on up the line so that all of the chain relays from five on up are then de-energized. The next down traveling car therefore receives no stopping signal until it arrives at the fourth floor.

In the event that one of the higher floor calls should become an overtime signal or a signal at that floor be bypassed by a car operating with its bypass switch thrown, that is one not answering a special call, then either the auxiliary relay or the timer for that floor would be operated thereby re-energizing the chain relay for that particular floor only. The energization of such a relay does not energize the relays above because the circuit for the next above relay is interrupted as soon as the call became a preferred call.

In this circuit, as in the previous circuit, means are provided for re-establishing normal service for higher floors as an elevator proceeds downwardly in answering a special call. This circuit includes a lead 97 connected to the line L5 and connected through bypass contacts BP and down preference relay contacts DL to a brush 98 cooperating with a reset line of contacts 99. The brush 98 is long enough to span the space from one such contact 99 in the lane to the next. Current flow from the brush 98 to the contacts 99 of the reset lane provides power directly to the chain relay for the floor above the instantaneous position of the car. Energization of that relay provides power for the stopping circuit for that floor in case a call is registered at that floor and also causes that chain relay to close its contacts to complete the circuit for the chain relay for the floor above. This latter circuit, of course, is subjected to there being no special preference calls for next lower floor. Thus the energization of each of the chain relays as a car proceeds down the shaft re-establishes normal service for the floors above.

The various circuits shown provide for special or preferred service to answer overtime calls or calls that have been previously bypassed. However, in each of these arrangements only one car will answer or proceed to answer such overtime or previously bypassed calls and that car re-establishes normal service for any following cars. The occurrence of an overtime or previously bypassed call between down traveling cars causes the next following car to also become a special or preferred service car with respect to preferred service calls between the cars. However, without such a preferred service call between the cars following car answers calls in normal manner.

The special preferred service calls may originate in various ways, for example, as shown in the circuits timers are employed to time the duration of registered down calls and to make them preference calls at the expiration of given time intervals. Likewise, auxiliary relays are used in some of the circuits and arranged to be energized in case a down traveling car which has become loaded and which is in condition to bypass signals bypasses the signal at that floor. Also these auxiliary relays may be energized by buttons arranged at the landings and which may be termed as emergency or special preferred service buttons. Such a button is shown in connection with the fourth floor relay as is shown in Figure IV.

Various modifications in the circuits shown in these various embodiments may be made without losing the advantages obtained by providing preferred service for special calls. This preferred service thus takes the place of the zoning that is sometimes used in an effort to increase the efficiency of a multi-car elevator bank. With this system such zoning is not required because the cars automatically and individually, in effect, zone themselves in answering those calls entitled to preferred service.

Having described the invention, I claim:

1. In a signal control for a bank of elevators, in combination, a floor selecting machine for each elevator, a first lane of contacts on each selector for energizing stop circuits of the elevators, floor call registering means for each floor, a set of call contacts for each floor that are closed when a call is registered for that floor and that are connected to the respective contacts of the first lanes of contacts, a preferred service relay for each floor, a series circuit comprising normally closed contacts on the preferred service relays for connecting a source of power to the call registering contacts, each set of call contacts being energized through normally closed contacts of the preferred service relays associated with the floors ahead, a second lane of contacts on each floor selector, a brush and circuit arranged to energize said second lane contacts for each floor as the elevator leaves that floor, said second lane contacts being connected to the call contacts, means for energizing said brush and thereby the call contacts of the passed floors, and means for preventing the flow of power from the call contacts of passed floors to floors ahead.

2. In a signal control for a bank of elevators, in combination, a floor selector machine for each elevator, a first lane of contacts on each selector operatively connected to stopping circuits for the elevator, floor relays for registering floor calls, each relay having a set of contacts for energizing the stopping contacts of the selector machines for the corresponding floor, a preferred service relay for at least some of the floors, contacts on the preferred service relays for supplying power when the relays are conditioned for non-preferred service to each floor relay contact from the relay contact of a floor ahead, means for connecting the last relay contacts to a source of power, contacts on each preferred service relay arranged to connect the contacts of the corresponding floor relay to a source of power when the preferred service relay is energized for preferred service, means on each floor selector machine for energizing the floor relay contacts of at least one floor behind the elevator, and means for interrupting current flow from said last mentioned means to relay contacts for floors ahead, whereby the conditioning of a preferred service relay for preferred service opens the stopping circuits for all non-preferred floor calls ahead of the next following elevator and the next following elevator restores normal service for a second following elevator.

3. In a signal control for a bank of elevators, in combination, a floor selector machine for each elevator, a lane of contacts on each selector machine that cooperates with stopping circuits of the associated elevator, a set of floor relays for registering floor calls, a set of contacts on each floor relay for energizing all the first lane contacts corresponding to that floor, a first preferred service relay for each floor that is to receive preferred service, a special preferred service relay for each floor that is to receive special preferred service, means for selectively energizing the first and special service relays, means including contacts on the first preferred service relay that are closed when conditioned for non-preferred operation adapted to transmit control power to the floor relay contacts of at least the next floor behind, means adapted to energize the corresponding floor relay contacts when the first preferred service relay is conditioned for preferred service, said means including series connected contacts of the special preferred service relays corresponding to the floors ahead, and contacts on at least some of the special preferred service relays which close when conditioned for special preferred service and which are adapted to connect the corresponding floor relay contacts directly to a source of power.

4. In a signal control according to claim 3, a second lane of contacts on each selector machine with the contacts adapted to energize the corresponding floor relay contacts, means on each selector machine for energizing the contacts of the second lane corresponding to at least the first floor behind the elevator and means for preventing the flow of power from said second lane contacts to floor relay contacts for floors ahead of the elevator.

5. In a signal control for a bank of elevators, in combination, a floor selector mechanism for each elevator, a lane of contacts on each selector that cooperate with stopping circuits of the elevator, a set of floor relays having contacts arranged to energize the contacts of said lanes corresponding to the respective floors to be served, a preferred service relay for each floor to receive preferred service, a special preferred service relay for each floor to receive special service, means including in series contacts of the preferred and special preferred relay that are closed when the relays are conditioned for non-preferred service for transmitting current to the contacts of the floor relay corresponding to the next previous floor, means for energizing the floor relay contacts of the last floor to be served, circuit means including a contact of an energized preferred service relay and contacts of non-operated special preferred service relays for floors ahead of the preferred service call for energizing the floor relay contacts corresponding to the operated preferred service relay, and circuit means including a contact of an operated special preferred service relay for energizing the floor relay contacts corresponding to the operated special service relay.

6. In a signal control according to claim 5, a second lane of contacts on each floor selector, said contacts being connected to the floor relay contacts of the corresponding floor relays, means for energizing at least the first second-lane contact behind an elevator, and means for preventing power from flowing from the energized second-lane contact to floor relay contacts ahead of the elevator.

7. In a signal control system for a bank of elevators, in combination, a floor selector mechanism for each elevator, a lane of contacts on each selector that cooperate with stopping circuits of the elevator, a set of floor relays having contacts adapted to energize the selector contacts, a preferred service relay for each floor, a special preferred service relay for each floor, means for energizing the floor relay contacts, means operable by the conditioning of a preferred or special preferred relay for preferred service for de-energizing the floor relay contacts for floors behind the conditioned preferred service relay, by-pass means operable by a conditioned preferred or special preferred service relay for energizing the corresponding floor relay contacts, and means operable upon the conditioning of preselected preferred service relays for interrupting said by-pass means for floors behind the preselected floors.

8. In a signal control system according to claim 7, a second lane of contacts on each selector with the contacts connected to the corresponding floor relay contacts, and means on each selector for energizing the second lane contacts for at least one floor behind the elevator position.

9. In a signal control system for a bank of elevators, in combination, a floor selector mechanism for each elevator, a lane of contacts on each selector that cooperate with stopping circuits of the elevator, a set of floor relays having contacts connected to the corresponding contacts of the selector mechanisms, a timer for each floor to receive preferential service, said timer being energized through the corresponding floor relay, circuit means including contacts of non-operated timers for energizing the floor relay contacts corresponding to floors behind the timers, circuit means including contacts of operated timers for energizing the floor relay contacts of the floor relay corresponding to an operated timer, a second lane of contacts on each selector mechanism with the contacts connected to the floor relay contacts, a brush on each selector for energizing the second lane contact for a floor as the elevator leaves the floor, and means for interrupting the flow of power from said second lane contacts to the contacts of floor relays corresponding to floors ahead of the elevator.

10. In a signal control system according to claim 9, a preferred service relay for each floor, means on each preferred service relay included in said circuit means for non-operated timers for interrupting said circuit means when a preferred service relay is conditioned for preferred service, means operable by each preferred service relay for energizing the corresponding floor relay contact, and means for energizing the preferred service relays.

11. In a signal control system according to claim 10, a third lane of contacts on each selector mechanism, a by-pass control in each elevator, and circuit means including the by-pass control and the third lane contacts for energizing the corresponding preferred service relay when an elevator by-passes a stop signal.

12. In a signal control system for a bank of elevators, in combination, a floor selector mechanism for each elevator, a first lane of contacts on each selector that cooperates with stopping circuits for the elevator, a set of floor relays having contacts connected to the corresponding first lane contacts, at least one preferred service relay for each floor to receive preferred service, means for operating the preferred service relays, circuit means including contacts of the preferred service relays for floors ahead and rectifiers for energizing the floor relay contacts, a direct current source of power connected to said circuit means, a second lane of contacts on each floor selector, said contacts being connected to the floor relay contacts, and a selector brush connected to the direct current power source and arranged to energize each second lane contact as the elevator leaves that floor.

13. In a signal control system for a bank of elevators, in combination, a floor selector mechanism for each elevator, a first lane of contacts on each selector that cooperates with stopping circuits for the elevator, a set of floor relays having contacts connected to the corresponding first lane contacts, a source of power, a chain of relays including a control relay for each floor, at least one preferred service relay for each floor, normally closed contacts on the preferred service relay included in at least the circuit for the operating coil of a control relay for the next floor, a normally open contact of each control relay included in series with the operating coil of the control relay for the next floor, contacts on each of the preferred service relays for completing a power circuit to the control relay for a floor at which the preferred service relay is operated, means for energizing the floor relay stopping contacts when the corresponding control relay is energized, a second lane of contacts on each selector mechanism, said contacts being connected to the operating coils of the control relays, and means including a brush cooperating with the second lane for energizing the control relay as an elevator leaves the corresponding floor.

14. In a signal control system for a bank of elevators, in combination, a floor selector mechanism for each elevator, a first lane of contacts on each mechanism that cooperate with stopping circuits for the corresponding elevator, a series of floor relays one for each floor, each of the floor relays having contacts connected to corresponding contacts of the selector mechanisms, a preferred service relay for each floor, circuit means including contacts of the preferred service relays for floors beyond for supplying power to the contacts of the floor relay whereby the registration of a preferred service call at one of the floors beyond de-energizes without canceling the calls ahead of the preferred service call, other contact means on the preferred service relay for individually re-energizing the stopping contacts for floors at which preferred service calls are registered, and means including a second lane of contacts connected to said floor relay contacts for re-energizing the floor relay contacts for floors behind an elevator answering a preferred service call.

No references cited.